US012254247B2

(12) United States Patent
Arimura et al.

(10) Patent No.: US 12,254,247 B2
(45) Date of Patent: Mar. 18, 2025

(54) INSPECTION RESULT ANALYSIS DEVICE, INSPECTION RESULT ANALYSIS METHOD, AND STORAGE MEDIUM

(71) Applicant: Kioxia Corporation, Tokyo (JP)

(72) Inventors: Yasushi Arimura, Yokkaichi (JP); Mizuka Nishio, Yokkaichi (JP); Yukio Yoshinaga, Suzuka (JP)

(73) Assignee: Kioxia Corporation, Tokyo (JP)

( * ) Notice: Subject to any disclaimer, the term of this patent is extended or adjusted under 35 U.S.C. 154(b) by 862 days.

(21) Appl. No.: 17/469,059

(22) Filed: Sep. 8, 2021

(65) Prior Publication Data
US 2022/0284151 A1 Sep. 8, 2022

(30) Foreign Application Priority Data

Mar. 4, 2021 (JP) .................................. 2021-034149

(51) Int. Cl.
*G06F 30/20* (2020.01)
*G06F 30/10* (2020.01)
(Continued)

(52) U.S. Cl.
CPC .............. *G06F 30/20* (2020.01); *G06F 30/10* (2020.01); *G06F 2111/10* (2020.01); *G06F 2119/02* (2020.01)

(58) Field of Classification Search
CPC ...... G06F 30/20; G06F 30/10; G06F 2119/02; G06F 2111/10
(Continued)

(56) References Cited

U.S. PATENT DOCUMENTS 7,664,614 B2 * 2/2010 Wu ........................... G03F 1/84
702/81
8,856,694 B2 * 10/2014 Ye ........................... G05B 13/04
716/54
(Continued)

FOREIGN PATENT DOCUMENTS

| CN | 115311203 A | * | 11/2022 | |
| EP | 2444991 A1 | * | 4/2012 | ............ H01J 37/222 |

(Continued)

OTHER PUBLICATIONS

Tanaka, Y. et al., "Robust Estimation of Mixed-Type Wafer Map Similarity Utilizing Non-negative Matrix Factorization", [online], AEC/APC Symposium Asia 2019, [retrieved on Feb. 25, 2021], retrieved from the Internet: <URL:https://www.semiconportal.com/AECAPC/abstract/TDA-022.pdf>, 2 pages.

*Primary Examiner* — Suresh Memula
(74) *Attorney, Agent, or Firm* — Oblon, McClelland, Maier & Neustadt, L.L.P.

(57) ABSTRACT

An inspection result analysis device includes a processor. The processor factorizes each first distribution of a first distribution group into a second distribution group and a weight group corresponding to the second distribution group by non-negative matrix factorization of the first distribution group. Each first distribution is a distribution of numerical data on a surface of a substrate, the numerical data resulting from an inspection of the substrate. The processor generates a fourth distribution by multiplying a third distribution by a weight corresponding to the third distribution to acquire a representative value of a numerical data group constituting the fourth distribution. The processor associates a fifth distribution with the third distribution when the representative value exceeds a threshold. The fifth distribution is one first distribution of the first distribution group. The third
(Continued)

distribution is one second distribution of the second distribution group which is factorized from the fifth distribution.

13 Claims, 7 Drawing Sheets

(51) Int. Cl.
*G06F 111/10* (2020.01)
*G06F 119/02* (2020.01)

(58) Field of Classification Search
USPC .......................................................... 716/56
See application file for complete search history.

(56) References Cited

U.S. PATENT DOCUMENTS

| | | | |
|---|---|---|---|
| 9,970,983 B2 | 5/2018 | Schachtner et al. | |
| 11,715,200 B2* | 8/2023 | Rezaei | G06V 10/56 |
| | | | 382/128 |
| 11,755,814 B2* | 9/2023 | Chen | G06F 30/398 |
| | | | 716/102 |
| 2011/0271239 A1* | 11/2011 | Lu | G03F 1/70 |
| | | | 716/55 |
| 2013/0339919 A1* | 12/2013 | Baseman | G05B 19/41875 |
| | | | 716/136 |
| 2014/0089871 A1* | 3/2014 | Hou | G06F 30/00 |
| | | | 716/56 |
| 2015/0169820 A1* | 6/2015 | Wang | G03F 1/36 |
| | | | 716/53 |
| 2015/0261908 A1* | 9/2015 | Hsieh | G03F 1/36 |
| | | | 716/52 |
| 2021/0143038 A1* | 5/2021 | Tanaka | H01L 21/67288 |
| 2023/0141799 A1* | 5/2023 | Biswas | G03F 7/70441 |
| | | | 716/53 |
| 2023/0229845 A1* | 7/2023 | Ma | G06F 30/398 |
| | | | 716/112 |
| 2023/0244137 A1* | 8/2023 | Fujimura | G03F 1/36 |
| | | | 716/53 |

FOREIGN PATENT DOCUMENTS

| | | | | |
|---|---|---|---|---|
| JP | 2011-7553 A | | 1/2011 | |
| JP | 2020-107138 A | | 7/2020 | |
| WO | WO-2021261352 A1 | * | 12/2021 | ....... H01L 21/67253 |

* cited by examiner

FIG.3

INSPECTION RESULT GROUP 200

ORIGINAL MAP B1 (WAFER W1)

ORIGINAL MAP B2 (WAFER W2)

ORIGINAL MAP B3 (WAFER W3)

ORIGINAL MAP B4 (WAFER W4)

| FEATURE MAP | WAFER | | | NUMBER OF WAFERS |
|---|---|---|---|---|
| F11 | W1 | W2 | W3 | 3 |
| F12 | W3 | W4 | | 2 |

INSPECTION RESULT ANALYSIS DEVICE, INSPECTION RESULT ANALYSIS METHOD, AND STORAGE MEDIUM

CROSS-REFERENCE TO RELATED APPLICATIONS

This application is based upon and claims the benefit of priority from Japanese Patent Application No. 2021-034149, filed on Mar. 4, 2021; the entire contents of which are incorporated herein by reference.

FIELD

Embodiments described herein relate generally to an inspection result analysis device, an inspection result analysis method, and a storage medium.

BACKGROUND

In the process of or after fabrication of semiconductor integrated circuits on substrates, the substrates are individually subjected to an inspection. Through the inspection, substrates having a failure in a large area may be detected.

A result of the inspection of such a substrate having a failure in a large area may exhibit a feature arising from the cause of the failure. In view of this, to investigate what has caused the failure or identify substrates having a failure arising from the same cause, the substrates are subjected to processing including specifying features appearing in the results of the inspection and classifying the substrates by feature.

DETAILED DESCRIPTION

According to one embodiment, in general, an inspection result analysis device includes a memory and a processor connected to the memory. The processor is configured to factorize each first distribution of a first distribution group into a second distribution group and a weight group by non-negative matrix factorization of the first distribution group. Each first distribution of the first distribution group is a distribution of numerical data on a surface of a substrate, the numerical data resulting from an inspection of the substrate. Each weight of the weight group corresponds to a respective second distribution of the second distribution group. The processor generates a fourth distribution by multiplying a third distribution by a weight corresponding to the third distribution. The processor acquires a representative value of numerical data group constituting the fourth distribution. The processor associates a fifth distribution with the third distribution when the representative value exceeds a threshold, and refrains from associating the fifth distribution with the third distribution when the representative value is less than the threshold. The fifth distribution is one first distribution of the first distribution group. The third distribution is one second distribution of the second distribution group which is factorized from the fifth distribution.

Hereinafter, an inspection result analysis device, an inspection result analysis method, and a storage medium according to embodiments will be described in detail with reference to the accompanying drawings. The following embodiments are presented for illustrative purposes only and are not intended to limit the scope of the present invention.

Embodiment

Figure 1:
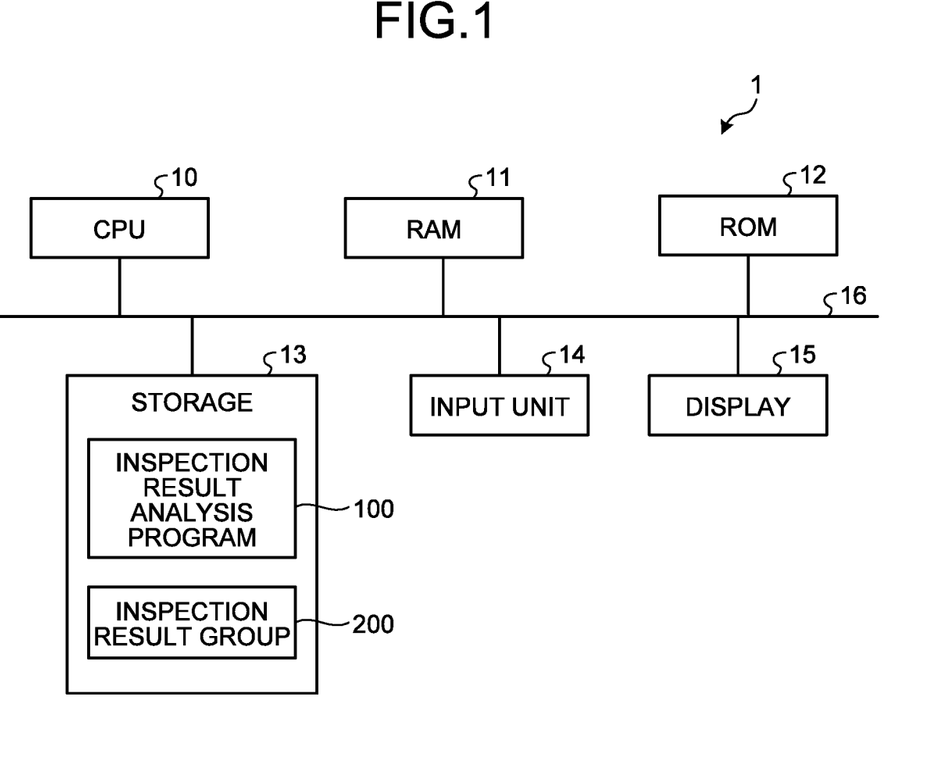
FIG. 1 is a schematic diagram illustrating an exemplary hardware configuration of an inspection result analysis device according to an embodiment.

FIG. 1 is a schematic diagram illustrating an exemplary hardware configuration of an inspection result analysis device according to an embodiment.

An inspection result analysis device 1 has the same or like configuration as a general computer capable of executing a computer program. In FIG. 1, the inspection result analysis device 1 includes a central processing unit (CPU) 10, a random access memory (RAM) 11, a read only memory (ROM) 12, a storage 13, an input unit 14, and a display 15. The CPU 10, the RAM 11, the ROM 12, the storage 13, the input unit 14, and the display 15 are electrically connected to one another via a bus 16.

The input unit 14 serves as a human machine interface (HMI) for information input. The input unit 14 includes, for example, a pointing device or a keyboard. The operator manipulates the input unit 14 to enter information to be transmitted to the CPU 10.

The display 15 serves as an HMI capable of outputting information as an image. Examples of the display 15 include an image display device such as a liquid crystal display, an organic electro-luminescence (EL) display, and a plasma display.

The CPU 10 serves as a processor that executes a computer program.

The RAM 11 is a volatile memory that operates at a higher speed than the ROM 12 or the storage 13. The RAM 11 serves to provide the CPU 10 with a cache or buffer area.

The ROM 12 and the storage 13 are memories capable of storing therein information such as data or a computer program in a nonvolatile manner. The storage 13 can store a larger amount of information than the ROM 12.

The storage 13 can include, for example, a hard disk drive (HDD), a solid state drive (SSD), or a combination of both.

The storage 13 may be located outside the inspection result analysis device 1 and connected to the inspection result analysis device 1 via a network, for example. In addition, the storage 13 may be a detachable device such as a universal serial bus (USB) memory, a secure digital (SD) card, and an external HDD.

In an embodiment, the storage 13 stores therein an inspection result analysis program 100 being a computer program. For example, the CPU 10 loads and executes the inspection result analysis program 100 from the storage 13 to the RAM 11. The CPU 10 implements functions of the inspection result analysis device 1 in accordance with the inspection result analysis program 100 loaded to the RAM 11.

The storage 13 further stores therein an inspection result group 200 as results of inspection of a group of substrates.

As an example, the substrate refers to a circular silicon wafer having a large number of chips formed thereon and before being diced into individual chips. Such chips are semiconductor integrated circuit chips. The material of the substrate is not limited to silicon. The substrate may not be circular in shape. The substrate may be an individual chip after dicing. Hereinafter, the silicon wafer serving as the substrate will be simply referred to as a wafer.

In the following, the wafers will be individually distinguished by wafer IDs. A wafer with a wafer ID Wx where x is a numerical value is referred to as a wafer Wx.

Herein, a defect inspection is described as an exemplary inspection. In the inspection of one wafer, defects may be detected from multiple positions on the wafer surface. In such a case the numbers of defects at the positions are counted to record the numbers of the defects in association with the positions. Thereby, a distribution of the number of defects on the wafer surface is obtained. Hereinafter, the defect distribution on the wafer surface obtained through the inspection will be referred to as an original map. The original map is an exemplary first distribution.

Figure 2:
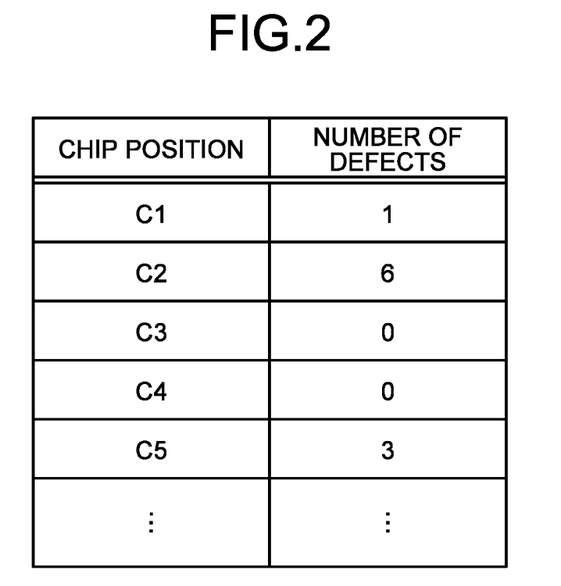
FIG. 2 is a schematic view illustrating an exemplary data configuration of an original map in the embodiment.

FIG. 2 is a schematic view illustrating an exemplary data configuration of an original map in an embodiment. In this example, the original map has a data format containing total counts of defects on chips and chip positions in association with each other. The chip position represents a position of a chip on a wafer, and is expressed as a two-dimensional coordinate value with an origin set at a given position on the wafer. In FIG. 2, the chip positions are denoted by names C1, C2, . . . of chips disposed at the chip positions for the sake of convenience.

The inspection result group 200 refers to a group of original maps of wafers resulting from a single inspection.

Figure 3:
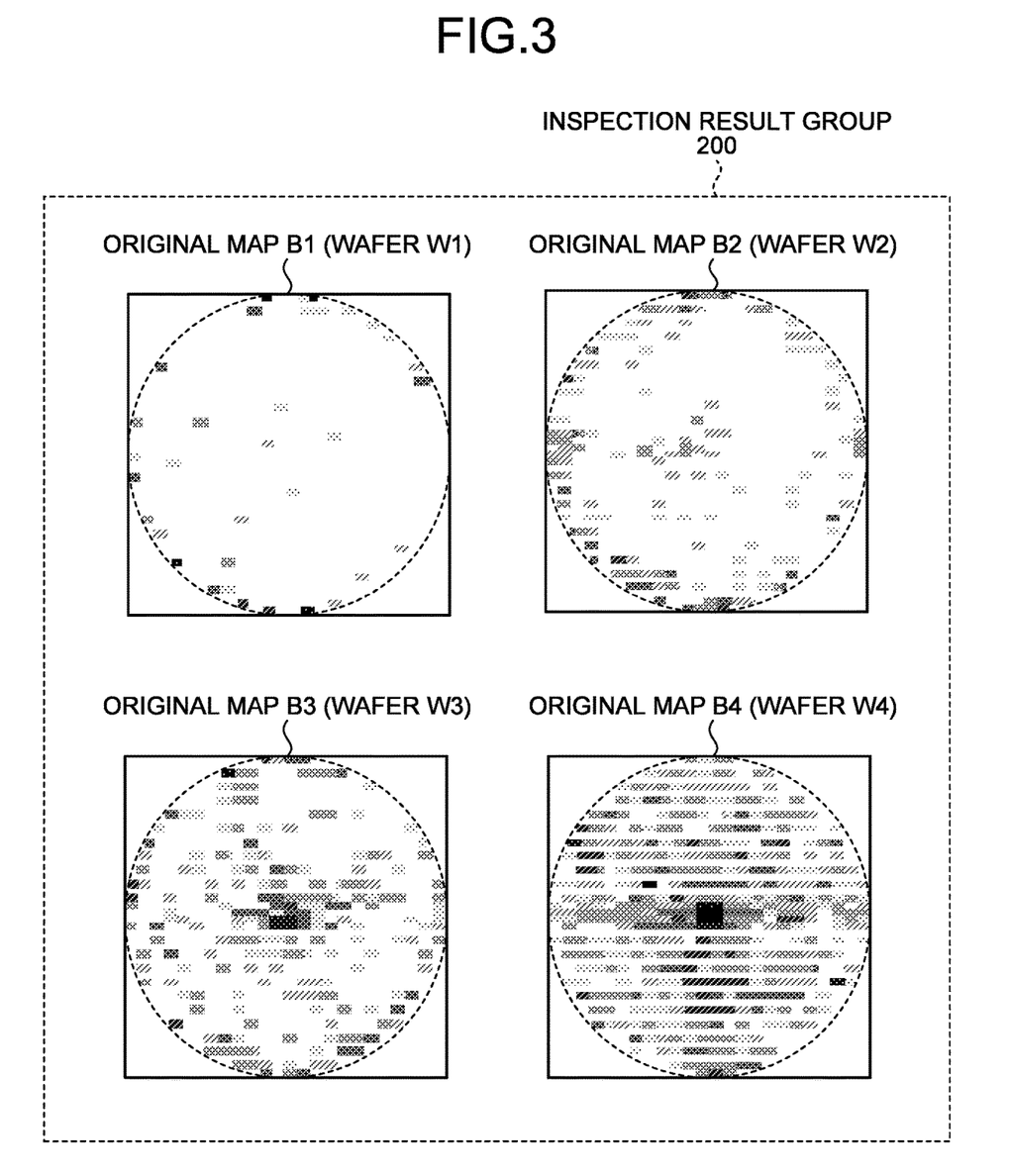
FIG. 3 is a schematic view illustrating an inspection result group in the embodiment.

FIG. 3 is a schematic view illustrating the inspection result group 200 in an embodiment. FIG. 3 graphically depicts an original map B1 of a wafer W1, an original map B2 of a wafer W2, an original map B3 of a wafer W3, and an original map B4 of a wafer W4 as results of an inspection. The inspection result group 200 thus consists of the original map B1, the original map B2, the original map B3, and the original map B4.

In FIG. 3, the number of defects at each chip position on one original map is represented by a contrast value at the same position. The larger the number of defects is, the darker in color depicted the chip positions are, and the smaller the number of defects is, the lighter in color depicted the chip positions are. In each original map the circle indicated by a dotted line represents the boundary of the wafer.

For the sake of better understanding, the number of original maps constituting the inspection result group 200 is set to four in FIG. 3, however, it is not limited to four. For example, the inspection result group 200 may include a hundred original maps of a hundred wafers. The inspection result group 200 including a larger number of original maps contributes to improving the accuracy of feature identifying processing, which will be described later.

Hereinafter, an original map of the wafer Wx (where x is a numerical value) resulting from an inspection is referred to as the original map of the wafer Wx.

Through a wafer inspection, a failure may be detected from a large area of the wafer. The failure refers to an event that a characteristic fails to meet a criterion. For example, an event that the number of defects per chip exceeds a certain value is regarded as a failure. The original map of a wafer including a failure in a large area may exhibit a feature arising from the cause of the failure. The original map may show different features due to different causes of the failure. In addition, a failure may arise from two or more causes. In such a case the original map may exhibit different features depending on the causes of the failure.

It is thus preferable to individually identify one or more features of the original maps to classify the original maps by feature. This enables the operator to identify the cause of a failure from a result of the classification, know the number of wafers having a failure occurring from the same cause, and use the result of the classification for reviewing various kinds of setting in the fabrication process.

In the embodiment, to accurately identify the features of the original map, the inspection result analysis device 1 executes non-negative matrix factorization (NMF). The inspection result analysis device 1 factorizes each original map into a feature map group and a weight group for the feature map group by executing NMF to the inspection result group 200. The feature map represents a distribution of the number of defects on the wafer surface exhibiting a single feature. The feature map is an exemplary second distribution.

Figure 4:
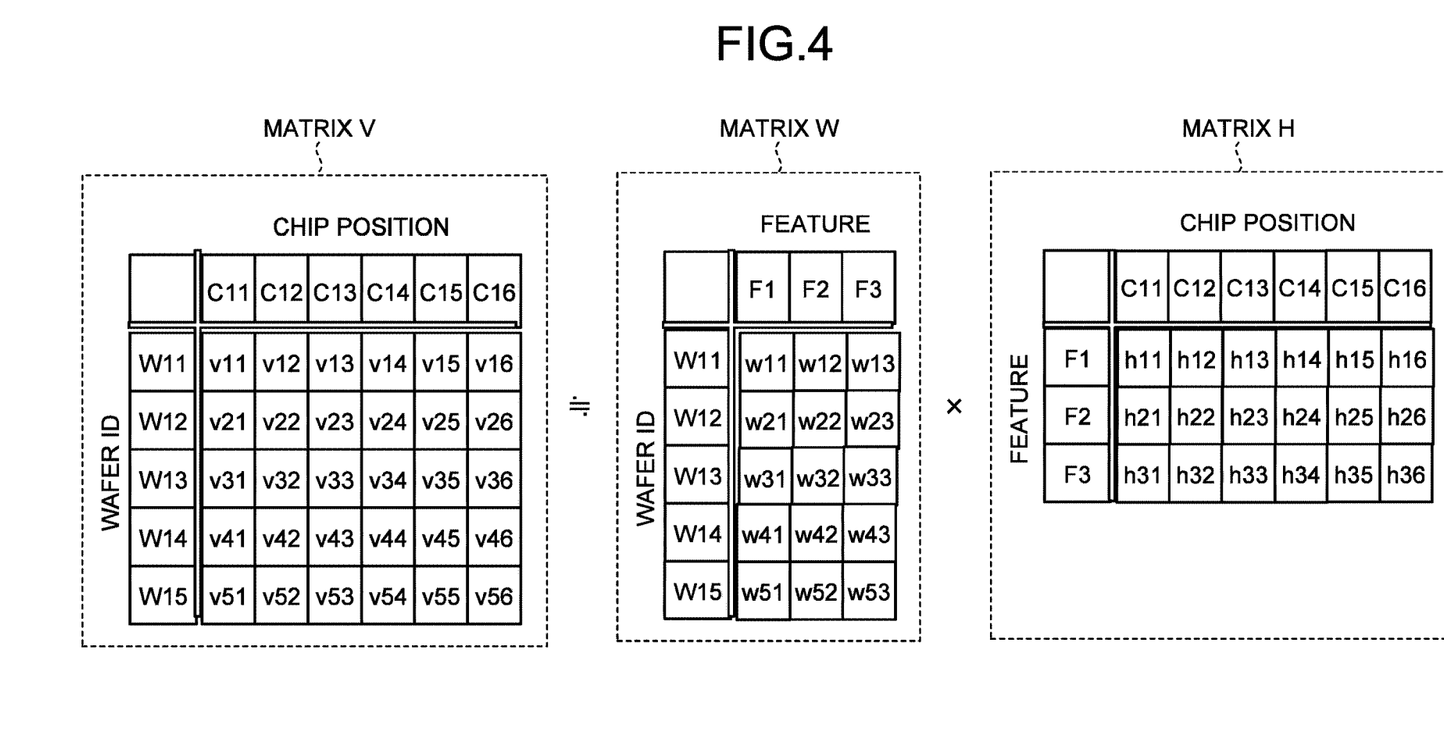
FIG. 4 is a schematic view for explaining NMF processing executed by the inspection result analysis device in the embodiment.

FIG. 4 is a schematic view for explaining NMF processing executed by the inspection result analysis device 1 in detail in an embodiment. NMF refers to approximation of a matrix V including a non-negative numerical data group by a product of a matrix W and a matrix H both including a non-negative numerical data group. FIG. 4 depicts the matrices in simpler structure and replacement of representation form for the sake of better understanding. For example, the matrices are in the form of a table. The number of original maps constituting the inspection result group 200 is set to five, and the number of pieces of numerical data constituting one original map is set to six. The numerical data constituting the original map represents the number of defects per chip.

The matrix V represents the inspection result group 200 in a matrix form. The matrix V consists of the same number of rows as the number of original maps constituting the inspection result group 200 and the same number of columns as the number of pieces of numerical data constituting one original map. That is, the matrix V is five rows by six columns in this example. In FIG. 4 the signs v11 to v16, v21 to v26, v31 to v36, v41 to v46, and v51 to v56 represent non-negative numerical data.

The six columns of the matrix V correspond to the chip positions one to one. A column corresponding to a chip position C11, a column corresponding to a chip position C12, a column corresponding to a chip position C13, a column corresponding to a chip position C14, a column corresponding to a chip position C15, and a column corresponding to a chip position C16 are arranged in this order along the row.

The five rows of the matrix V represent a numerical data group constituting one original map. A row representing an original map of a wafer W11, a row representing an original map of a wafer W12, a row representing an original map of a wafer W13, a row representing an original map of a wafer W14, and a row representing an original map of a wafer W15 are arranged in this order along the column.

The matrix H represents a plurality of feature maps in a matrix form. The matrix H consists of the same number of rows as the number of feature maps and the same number of columns as the number of pieces of numerical data constituting one feature map. In this example, it is assumed that three feature maps be identified. Thus, the matrix H is three rows by six columns. In FIG. 4 the signs h11 to h16, h21 to h26, and h31 to h36 represent non-negative numerical data.

The six columns of the matrix H correspond to the chip positions. The correspondence between the columns and the chip positions is the same as that of the matrix V. That is, a column corresponding to the chip position C11, a column corresponding to the chip position C12, a column corresponding to the chip position C13, a column corresponding to the chip position C14, a column corresponding to the chip position C15, and a column corresponding to the chip position C16 are arranged in this order along the row.

The three rows of the matrix H each represent a numerical data group constituting one feature map. That is, the matrix H represents three feature maps. A feature map represented by the first row of the matrix H is referred to as a feature map F1, a feature map represented by the second row of the matrix H is referred to as a feature map F2, and a feature map represented by the third row of the matrix H is referred to as a feature map F3.

As seen from the configuration of the matrix H, the feature maps each include the numerical data group at each chip position, as with the original maps.

The matrix W includes weight groups for the respective feature maps as to all the original maps. The matrix W consists of the same number of rows as the number of the original maps and the same number of columns as the number of the feature maps. Thus, the matrix W consists of five rows by three columns in this example. In FIG. 4 the signs w11 to w13, w21 to w23, w31 to w33, w41 to w43, and w51 to w53 represent non-negative numerical data.

The first column of the matrix W corresponds to the feature map F1. The second column of the matrix W corresponds to the feature map F2. The third column of the matrix W corresponds to the feature map F3.

The first row of the matrix W represents a weight group as an approximation of the original map of the wafer W11 by a weighted sum of the feature map F1, the feature map F2, and the feature map F3. The second row of the matrix W represents a weight group as an approximation of the original map of the wafer W12 by a weighted sum of the feature map F1, the feature map F2, and the feature map F3. The third row of the matrix W represents a weight group as an approximation of the original map of the wafer W13 by a weighted sum of the feature map F1, the feature map F2, and the feature map F3. The fourth row of the matrix W represents a weight group as an approximation of the original map of the wafer W14 by a weighted sum of the feature map F1, the feature map F2, and the feature map F3. The fifth row of the matrix W represents a weight group as an approximation of the original map of the wafer W15 by a weighted sum of the feature map F1, the feature map F2, and the feature map F3.

Figure 5:
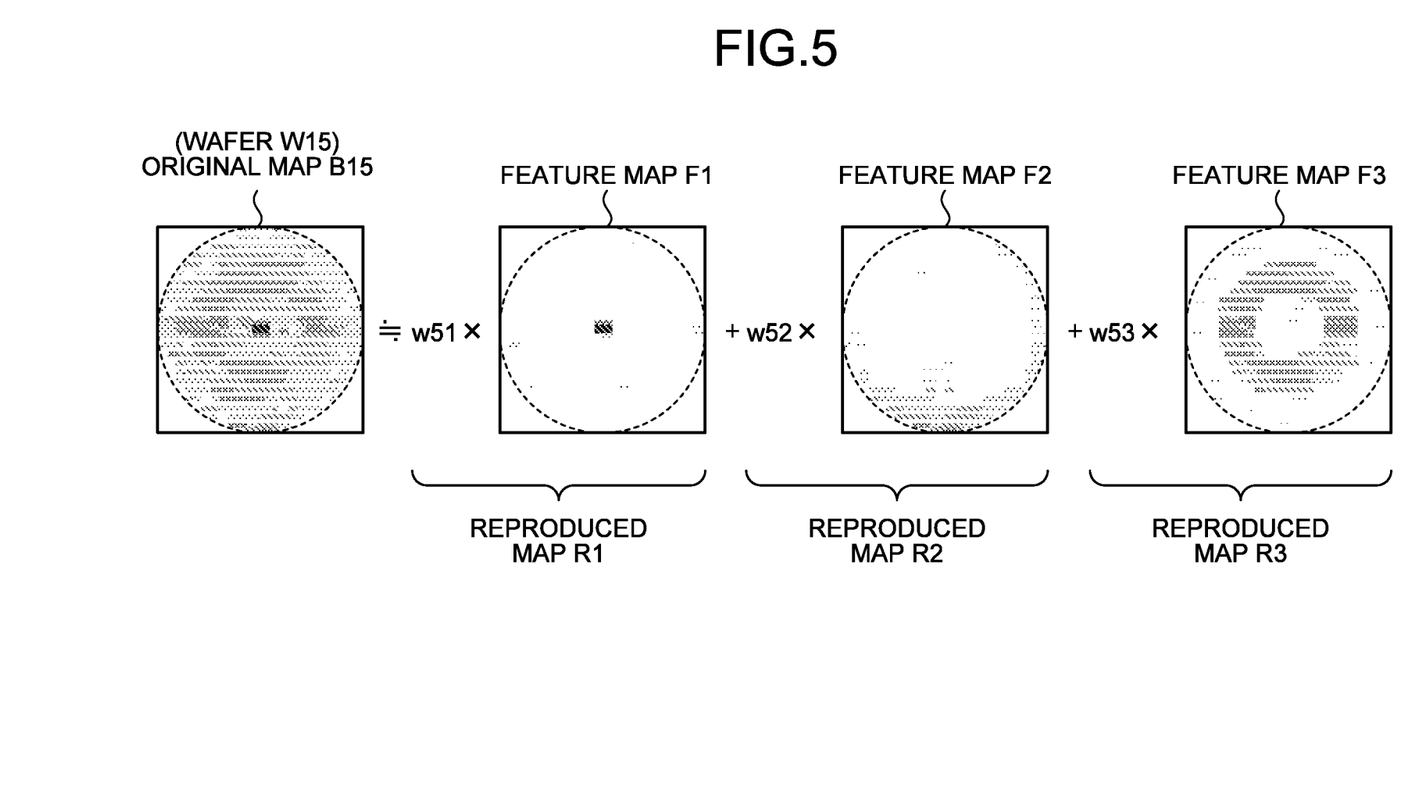
FIG. 5 is a view for explaining approximation of one original map to a weighted sum of three feature maps by exemplary NMF processing shown in FIG. 4.

FIG. 5 is a view for explaining an approximation of one original map by a weighted sum of three feature maps by the exemplary NMF processing described referring to FIG. 4. As an example, the original map (denoted by B15) of the wafer W15 will be described.

The numerical data group constituting each feature map can be obtained from the corresponding row of the matrix H. In the example illustrated in FIG. 5, in the feature maps, numerical data at each chip position is expressed as a contrast value at the position. The larger the numerical values are, the darker in color depicted the chip positions are, and the smaller the numerical values are, the lighter in color depicted the chip positions are. In each feature map the circle indicated by a dotted line represents the boundary of the wafer.

In the example illustrated in FIG. 5, the feature map F1 shows a feature that numerical values are significantly larger in the center area of the wafer than the rest. The feature map F2 shows a feature that numerical values are significantly larger in a crescent-shaped area in the bottom right of the wafer than the rest. The feature map F3 shows a feature that numerical values are significantly larger in a ring-like area around the center of the wafer than the rest.

FIG. 5 depicts the original map B15 in the same representation form as the feature maps, as an example.

According to the matrix W illustrated in FIG. 4, a weight group for the original map B15 consists of w51, w52, and w53. It can be thus seen from FIG. 5 that the original map B15 can be approximated to a sum of a map obtained by multiplying the feature map F1 by the weight w51, a map obtained by multiplying the feature map F2 by the weight w52, and a map obtained by multiplying the feature map F3 by the weight w53. Multiplying a feature map by a weight signifies multiplying all pieces of numerical data constituting the feature map by the weight.

In this manner, each of the original maps is factorized into the feature map group and the weight group for the feature maps by NMF. This makes it possible to separately detect two or more features of one original map.

For the purpose of comparison with the embodiment, a technique of identifying a feature by hierarchical clustering can be considered. This technique is referred to as a first comparative example. By hierarchical clustering, a cluster of similar elements is formed. The inspection result group 200 is classified into one or more clusters in accordance with a similarity among original maps, and each of the one or more clusters is handled as a set of original maps exhibiting the same feature.

With respect to one original map showing two or more features, however, the first comparative example cannot separate the individual features due to the principle of hierarchical clustering. Further, in the first comparative example a combination of the features may be handled as a single feature.

To the contrary, according to the embodiment, it is possible to separate two or more features of one original map by NMF, enabling more accurate identification of the individual features than the first comparative example.

The feature maps identified by NMF can be considered to be associated with causes of a failure. In the following, two or more failures arising from different causes are distinguished as failures in different modes. That is, it is considered that the respective feature maps identified by NMF represent different modes. Such a mode may be referred to as a failure mode.

The inspection result analysis device 1 classifies the original map group constituting the inspection result group 200 into feature map groups identified by NMF. In this disclosure, the term "classify" or "classification" refers to associating each of the original maps with one or more feature maps of the feature map group. There may be an original map or original maps not associated with any feature map depending on a type of classification.

The inspection result analysis device 1 classifies the original map group according to a result of determination as to whether a failure in a mode represented by each of the feature maps is occurring. Upon inferring that a certain original map has a failure in a certain mode, the inspection result analysis device 1 associates the certain original map with the certain mode.

The following will describe another technique for the purpose of comparison with the embodiment. This technique is referred to as a second comparative example. According to the second comparative example, an original map is classified into feature maps with reference to a comparison between a weight and a threshold. That is, whether a failure in a mode represented by each feature map is occurring is determined through a comparison between a weight and a threshold. For the sake of distinction, the threshold used in the embodiment is denoted by ThA, and the threshold used in the second comparative example is denoted by ThB.

According to the second comparative example, w51, w52, and w53 are individually compared with the threshold ThB with respect to the original map of the wafer W15, for example. When w51 exceeds the threshold ThB, the original map of the wafer W15 is associated with the feature map F1. When both w51 and w52 exceed the threshold ThB, the original map of the wafer W15 is associated with the feature map F1 and the feature map F2.

The feature maps are each configured to represent a distribution of the number of defects as one feature. The weight corresponds to a dimensionless quantity representing a degree of appearance of a distribution of the number of defects, represented by the corresponding feature map, on the original map. Defect distributions represented by the feature maps may differ in scale from each other. That is, the weight may vary in scale depending on the scale of the distribution of the number of defects represented by the feature map.

An improperly set threshold ThB causes difficulty in accurately determining occurrence or non-occurrence of a failure in a mode represented by each feature map. In the second comparative example, the weight varies in scale depending on the scale of the distribution of the number of defects represented by the feature map, which makes it difficult to set the threshold ThB appropriately. In addition, the threshold ThB needs to be set for each of the feature maps, imposing a greater operational load on the operator to set the thresholds ThB.

In the embodiment, the inspection result analysis device 1 reproduces a distribution of the number of defects corresponding to a feature map, among distributions of the number of defects included in the original map, by multiplying a weight and the feature map. The distribution obtained by the multiplication of the weight and the feature map is referred to as a reproduced map.

According to the example illustrated in FIG. 5, the inspection result analysis device 1 multiplies the feature map F1 by w51 to generate a reproduced map R1 corresponding to the feature map F1. The inspection result analysis device 1 multiplies the feature map F2 by w52 to generate a reproduced map R2 corresponding to the feature map F2. The inspection result analysis device 1 multiplies the feature map F3 by w53 to generate a reproduced map R3 corresponding to the feature map F3.

The original map can be represented as a sum of the reproduced map R1, the reproduced map R2, and the reproduced map R3. In other words, each of the reproduced map R1, the reproduced map R2, and the reproduced map R3 can be considered as a distribution of the net number of defects which are separated from the original map of the wafer W15 by feature.

The inspection result analysis device 1 acquires a representative value from each of the reproduced maps by an optional method to classify the original map according to a result of comparison between the representative value and the threshold ThA. In such a method, the distribution of the net number of defects is subjected to the comparison based on the threshold ThA. This allows simpler setting of the threshold ThA than the second comparative example. In addition, the threshold ThA can be set in common for all the feature maps.

As an example, assume that ten or more defects per chip be regarded as a failure. In such a case the operator sets the threshold ThA at 9. When the reproduced map R1 has a representative value of more than 9, the inspection result analysis device 1 associates the original map of the wafer W15 with the feature map F1. When the reproduced map R1 and the reproduced map R2 both have the representative value of more than 9, the inspection result analysis device 1 associates the original map of the wafer W15 with each of the feature map F1 and the feature map F2.

Meanwhile, the operator can set the threshold ThA based on his or her previous knowledge or findings. For example, the defect inspection may result in an erroneous detection of dust attached to a wafer surface as a defect. If the operator knows from his or her experience that five pieces of dust per chip on average are detected as a defect, the operator can set the threshold ThA at 5. The method of setting the threshold ThA is not limited to this example. The operator can set the threshold ThA by any method.

The representative value of the reproduced map can be obtained by any method. Herein, the representative value of the reproduced map is defined as a maximum value of a numerical data group constituting the reproduced map, by way of example.

Figure 6:
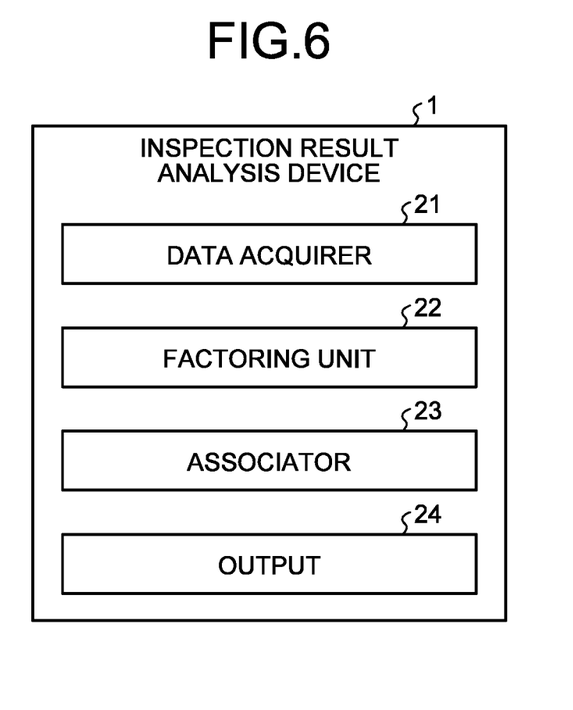
FIG. 6 is a schematic diagram illustrating an exemplary functional configuration of the inspection result analysis device in the embodiment.

FIG. 6 is a schematic diagram illustrating an exemplary functional configuration of the inspection result analysis device 1 in an embodiment. As illustrated in FIG. 6, the inspection result analysis device 1 includes a data acquirer 21, a factoring unit 22, an associator 23, and an output 24. The CPU 10 executes the inspection result analysis program 100, thereby implementing the respective functions of the data acquirer 21, the factoring unit 22, the associator 23, and the output 24.

The data acquirer 21 serves to acquire the inspection result group 200 from the storage 13. As described above, the inspection result group 200 corresponds to the original map group of each of two or more wafers resulting from a single inspection. In addition, the data acquirer 21 acquires the threshold to be used in the classification.

The factoring unit 22 serves to individually factorize the original maps into a feature map group and a weight group for the feature map group by executing NMF to the inspection result group 200.

The associator 23 serves to generate a reproduced map, acquire a representative value of numerical data constituting the reproduced map, and classifies the reproduced map based on the representative value and the threshold.

The output 24 serves to output a result of the classification to the display 15.

Figure 7:
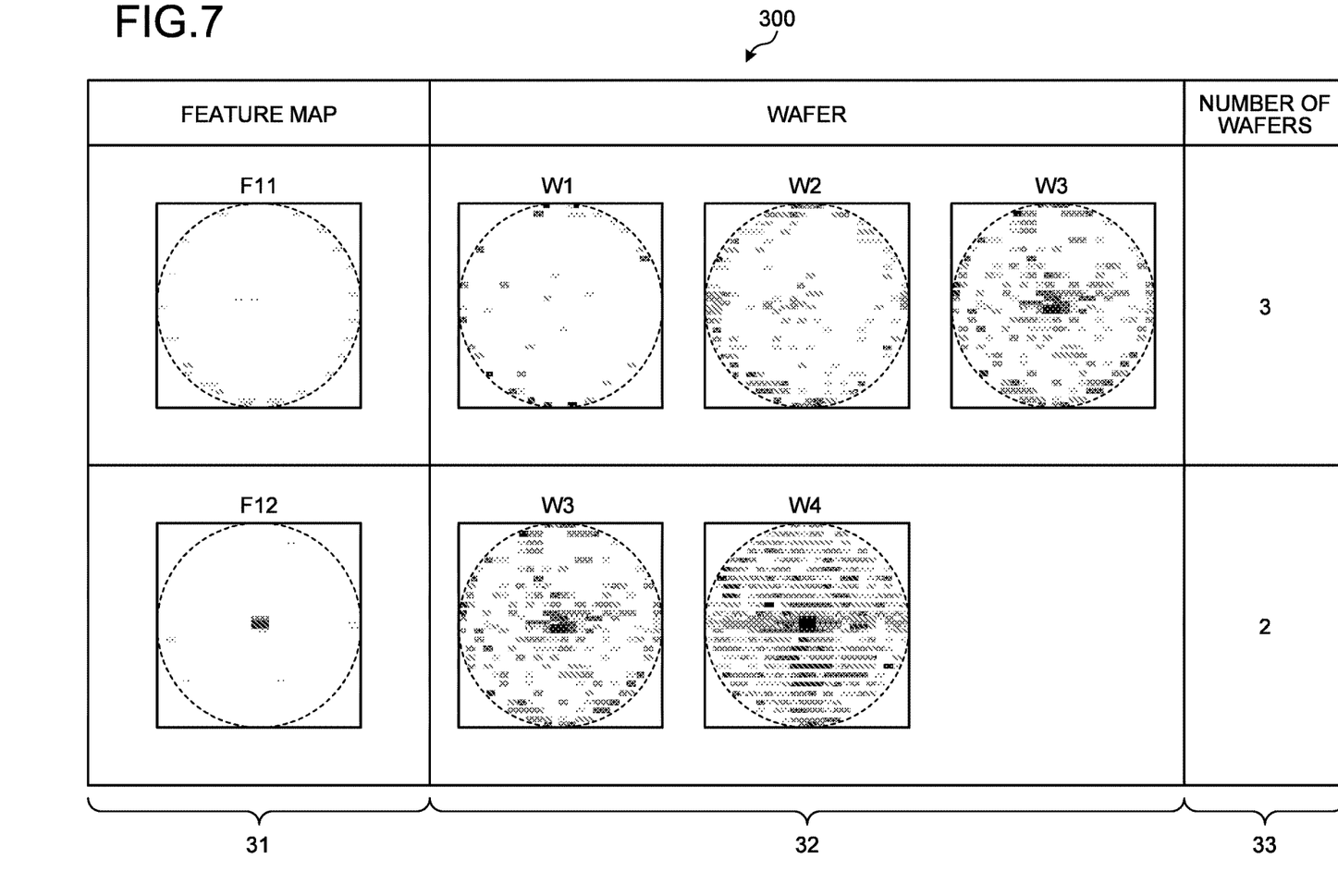
FIG. 7 is a schematic view illustrating an exemplary output form of a result of classification in an embodiment.

FIG. 7 is a schematic view illustrating an exemplary output form of a result of the classification in an embodiment. In the example illustrated in FIG. 7, a result of the classification to be output is a table 300 containing pairs of a feature map and one or more original maps in association with each other. In a field 31 of each row of the table 300, one feature map with an ID is graphically displayed. In a field 32 of each row of the table 300, one or more original maps with a wafer ID are graphically displayed in association with the feature map displayed in the field 31. The table 300 further includes a field 33 for displaying the number of wafers in association with each feature map.

In the example of FIG. 7, a feature map F11 is associated with an original map of the wafer W1, an original map of the wafer W2, and an original map of the wafer W3, and the number of wafers being three is on display in association with the feature map F11. A feature map F12 is associated with the original map of the wafer W3 and an original map of the wafer W4, and the number of wafers being two is on display in association with the feature map F12.

The operator can see, from the table 300, that the wafer W1, the wafer W2, and the wafer W3 have a failure in a mode represented by the feature map F11. The operator can also see that the wafer W3 and the wafer W4 have a failure in a mode represented by the feature map F12. In addition, the operator can see that the number of wafers having the failure in the mode represented by the feature map F11 is three and the number of wafers having the failure in the mode represented by the feature map F12 is two.

The table 300 illustrated in FIG. 7 is merely exemplary. The output 24 can output a pair of a feature map and one or more original maps in association with each other by any method. In addition, the table 300 may not include the field 33. The table 300 may additionally include a field for displaying any other information.

Further, the output 24 can generate the table 300 listing pairs of feature maps and one or more original maps under a given criterion in association with each other. The given criterion may be, for example, the order of the total counts of feature maps. The given criterion is not limited thereto.

The output 24 may not necessarily output all the feature map group obtained by NMF. For example, the output 24 may output a pair of one or more feature maps whose total counts is a given number or more and one or more original maps associated with the feature maps.

The feature maps shown in the table 300 is an exemplary sixth distribution.

Figure 8:
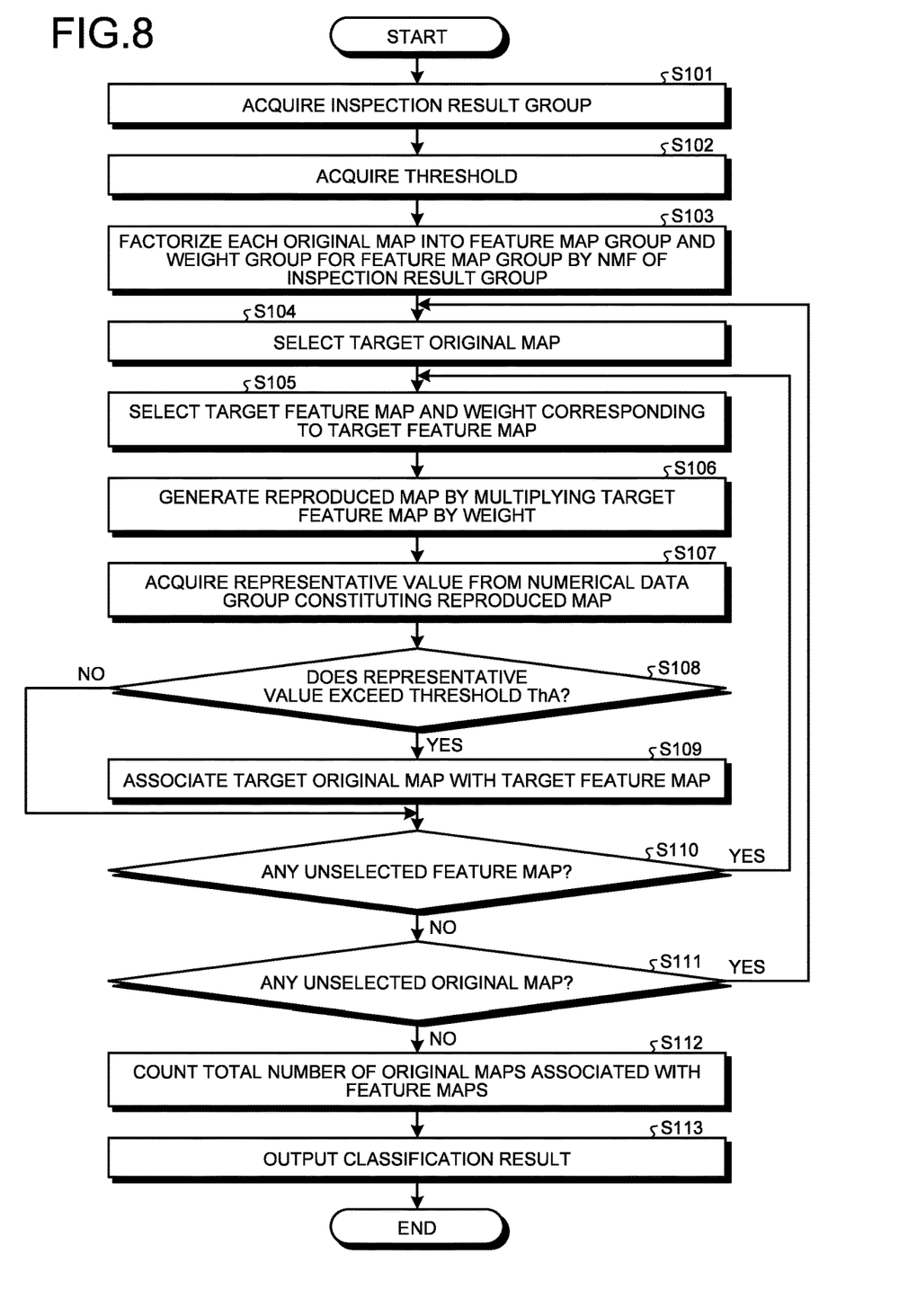
FIG. 8 is a flowchart illustrating an exemplary operation of the inspection result analysis device in an embodiment.

FIG. 8 is a flowchart illustrating an exemplary operation of the inspection result analysis device 1 in an embodiment. First, the data acquirer 21 acquires the inspection result group 200 from the storage 13 (S101). The data acquirer 21 acquires the threshold ThA (S102). For example, the data acquirer 21 allows the display 15 to display a setting screen for prompting the operator to enter the threshold ThA. The data acquirer 21 then acquires, as the threshold ThA, a numerical value that the operator has entered to the setting screen. The method of acquiring the threshold ThA is not limited to such an example.

The factoring unit 22 factorizes each original map into a feature map group and a weight group for the feature map group by executing NMF to the inspection result group 200 acquired by the data acquirer 21 (S103). The feature map group and the weight group are stored in, for example, the RAM 11.

The associator 23 selects one original map from the inspection result group 200 (S104). The original map selected in S104 is referred to as a target original map. The target original map is an exemplary fifth distribution.

The associator 23 then selects one feature map from the feature map group and a weight corresponding to the feature map from the weight group (S105). The feature map selected in S105 is referred to as a target feature map. The target feature map is an exemplary third distribution.

The associator 23 generates a reproduced map by multiplying the target feature map by the selected weight (S106). The reproduced map generated in S106 is an exemplary fourth distribution.

Subsequently, the associator 23 acquires a representative value from a numerical data group constituting the reproduced map (S107). For example, the associator 23 sets a maximum value of the numerical data group constituting the reproduced map as the representative value.

The associator 23 determines whether the representative value exceeds the threshold ThA (S108).

After determining the representative value as exceeding the threshold ThA (Yes in S108), the associator 23 associates the target original map with the target feature map (S109). Thereby, the target original map is classified into the target feature map.

After determining the representative value as not exceeding the threshold ThA (No in S108), the associator 23 skips S109.

After S109 or when the representative value does not exceed the threshold ThA (No in 108), the associator 23 determines whether there is any feature map that remains unselected in the feature map group (S110).

With one or more feature maps remaining unselected found (Yes in S110), the associator 23 transitions to S105, and selects a new feature map from unselected feature maps, and selects a weight corresponding to the new feature map. The associator 23 regards the new feature map as a target feature map, and executes the processing from S105 to S110 thereto.

With no feature map remaining unselected found (No in S110), the associator 23 determines whether there is any original map that remains unselected in the inspection result group 200 (S111).

With one or more original maps remaining unselected found (Yes in S111), the associator 23 transitions to S104, and selects one original map from the unselected original maps. The associator 23 regards the selected original map as a target original map, and executes the processing from S104 to Sill thereto. In transitioning from S111 to S104, the associator 23 clears the feature-map selection history and considers all the feature maps as unselected.

With no unselected original map found (No in S111), the associator 23 completes the classification. The associator 23 counts the total number of the original maps associated with the respective feature maps (S112). Subsequently, the output 24 outputs a result of the classification (S113). For example, the output 24 outputs a result of the classification to the display 15 in a table format such as the table 300 illustrated in FIG. 7.

This completes a series of operations according to an embodiment.

In the exemplary operation described with reference to FIG. 8, the associator 23 refrains from associating the target original map with the target feature map when the representative value matches the threshold ThA. How to handle the representative value matching the threshold ThA is not limited to this example. As an example, the associator 23 may be configured to associate the target original map with the target feature map when the representative value matches or exceeds the threshold ThA, and refrain from associating the target original map with the target feature map when the representative value is less than the threshold ThA.

In addition, the above has described the defect inspection as an exemplary inspection of the wafer group. The inspection of the wafer group is not limited to the defect inspection.

Further, the timing at which such an inspection is conducted is not limited to particular timing.

Semiconductor integrated circuit chips are formed by subjecting wafers to a plurality of fabrication processes. Examples of the fabrication processes include cleaning, film deposition, resist coating, exposure, and etching. In some of the fabrication processes, the wafers undergo inspections. Through each inspection, one physical index is acquired. Examples of the physical index include a dimension, a film thickness, the number of defects, binary data indicating the presence or absence of a defect, a top view, a density, a reflectance or attenuation rate of a wavelength, and a degree of surface unevenness.

The wafers undergo one or more inspections after having the semiconductor integrated circuit chips formed thereon. In each inspection after the chips are formed, one quality index is acquired. Examples of the quality index include an operation speed, a standby current value, a trimming voltage value, the number of defective bits, and redundancy in use.

The inspection result group 200 may be obtained by the inspection conducted in the fabrication process. In this case, the numerical data group constituting each original map represents a physical index obtained by the inspection. In addition, the inspection result group 200 may be obtained by the inspection conducted after the semiconductor integrated circuit chips are formed on the wafers. In this case, the numerical data group constituting each original map represents a quality index obtained by the inspection.

Further, the above has described the example that the threshold ThA is set at the value used for detecting an event regarded as a failure. The method of setting the threshold ThA is not limited thereto. To simply detect appearance of a feature, the operator can set the threshold ThA at a value for determining the appearance of the feature.

Further, the above has described the example that the associator 23 acquires the maximum value of the numerical data group constituting the reproduced map as the representative value. A statistic acquired as the representative value is not limited to the maximum value. The representative value may be an average value, a median value, an upper limit value of a 95% confidence interval, a third quartile, or a value obtained by multiplying any of these by a constant.

Further, the inspection result analysis device 1 may be configured to allow the operator to select the representative value from a maximum value, an average value, a median value, an upper limit value of a 95% confidence interval, a third quartile, or a value obtained by multiplying any of these by a constant. For example, the data acquirer 21 may allow the display 15 to display options of the representative value, such as a maximum value, an average value, a median value, an upper limit value of a 95% confidence interval, and a third quartile, to prompt the operator to select one of the options for the representative value. Upon receiving an operator's input for selecting one of the options, the data acquirer 21 sets the selected statistic as the representative value. The operator can select a desired statistic to be the representative value in view of variations in numerical data constituting the original map.

The associator 23 may acquire a plurality of statistics as representative values, and compare the respective representative values with the threshold ThA to determine execution/non-execution of the associating process from a combination of results of the comparison between the representative values and the threshold.

As an example, the associator 23 acquires the maximum value and the average value as representative values, and compares the two representative values with the threshold ThA. The associator 23 can be configured to associate the target original map with the target feature map when the two representative values exceed the threshold ThA, and refrain from associating the target original map with the target feature map when the two representative values match or are less than the threshold ThA or one of the two representative values exceeds the threshold ThA. Alternatively, the associator 23 may be configured to associate the target original map with the target feature map when at least one of the two representative values exceeds the threshold ThA, and refrain from associating the target original map with the target feature map when the two representative values match or are less than the threshold ThA.

The threshold ThA may be an integer or a real number having digits after the decimal point. Even if each piece of numerical data constituting the original map is an integer, each piece of numerical data constituting the reproduced map may be not an integer but a real number having digits after the decimal point. In such a case, by selecting a real number having digits after the decimal point as the threshold ThA, it is made possible to highly accurately classify the original maps.

According to the embodiment as described above, the inspection result analysis device 1 includes the factoring unit 22 and the associator 23. The factoring unit 22 factorizes each of the original maps into the feature map group and the weight group for the feature map group by executing NMF to the inspection result group 200. The associator 23 generate the reproduced map by multiplying the target feature map by the corresponding weight, to acquire the representative value of the numerical data group constituting the reproduced map. The associator 23 then associates the target original map with the target feature map when the representative value exceeds the threshold ThA, and refrains from associating the target original map with the target feature map when the representative value is less than the threshold ThA.

Thus, the inspection result analysis device 1 can individually identify multiple features appearing in one original map accurately, which enables more accurate classification of the original maps than the first comparative example. In addition, the threshold ThA is compared with the distribution of the net number of defects separated from the original map by feature, that is, the reproduced map. This make it possible for the operator to set the threshold ThA to an appropriate value more easily than the second comparative example. This further eliminates the necessity for the operator to set the threshold ThA for each of the features. That is, the inspection result analysis device 1 can accurately classify results of the inspection by a simpler operation.

The associator 23 sequentially selects the original maps as the target original map through repetitions of a loop process from S104 to S111 in FIG. 8. Upon sequentially selecting the target original maps, the associator 23 sequentially selects the feature maps as the target feature map through repetitions of a loop process from S105 to S110 in FIG. 8. The associator 23 then determines the association between pairs of the target original maps and the target feature maps with reference to the threshold ThA.

Thus, the associator 23 can classify the original map group constituting the inspection result group 200 into the feature map group.

Further, the output 24 outputs a pair of a feature map and one or more original maps in association with each other.

Thereby, in response to occurrence of a failure due to a certain cause, the operator can identify the wafers having a failure arising from the same cause.

In addition, the associator 23 counts the number of one or more original maps associated with a feature map, and the output 24 outputs a resultant in association with a pair of the feature map and the one or more original maps.

This makes it possible for the operator to know the number of the wafers having a failure due to the same cause.

The representative value of the numerical data group constituting the reproduced map can be defined as a maximum value, an average value, a median value, an upper limit value of 95% confidence interval, or a third quartile of the numerical data group constituting the reproduced map, or a value obtained by multiplying any of these values by a constant.

The inspection result analysis program 100 executed by the inspection result analysis device 1 of the embodiment may be prestored and provided in the storage 13. The storage 13 is an exemplary non-transitory, tangible computer readable storage medium. The inspection result analysis program 100 may be recorded and provided in an installable or executable file format in a non-transitory tangible computer readable storage medium, such as a compact disc (CD)-read only memory (ROM), a flexible disc (FD), a CD-R (Recordable), a digital versatile disk (DVD), a universal serial bus (USB) memory, and a secure digital (SD) card.

Further, the inspection result analysis program 100 may be stored on a computer connected to a network, such as the Internet, and provided by being downloaded via the network. The inspection result analysis program 100 may be provided or distributed via a network such as the Internet.

The above embodiment has described that the CPU 10 serving as a processor implements the functions of the data acquirer 21, the associator 23, and the output 24 by executing the inspection result analysis program 100. Alternatively, part or all of the functions of the data acquirer 21, the associator 23, and the output 24 may be implemented by logic circuitry. Part or all of the functions of the data acquirer 21, the associator 23, and the output 24 may be implemented by analog circuitry. Part or all of the functions of the data acquirer 21, the associator 23, and the output 24 may be implemented by a field-programmable gate array (FPGA) or an application specific integrated circuit (ASIC), for example.

In addition, the above embodiment has described that the inspection result group 200 is prestored in the storage 13. Alternatively, the inspection result group 200 may be stored in an external device. The inspection result analysis program 100 may be configured to acquire the inspection result group 200 from the external device.

While certain embodiments have been described, these embodiments have been presented by way of example only, and are not intended to limit the scope of the inventions. Indeed, the novel methods and systems described herein may be embodied in different other forms; furthermore, various omissions, substitutions and varies in the form of the methods and systems described herein may be made without departing from the spirit of the inventions. The accompanying claims and their equivalents are intended to cover such forms or modifications as would fall within the scope and spirit of the inventions.

What is claimed is:

1. An inspection result analysis device comprising:
   a memory; and
   a processor connected to the memory, the processor configured to:
   factorize each first distribution of a first distribution group into a second distribution group and a weight group by non-negative matrix factorization of the first distribution group, each first distribution of the first distribution group being a distribution of numerical data on a surface of a substrate, the numerical data resulting from an inspection of the substrate, each weight of the weight group corresponding to a respective second distribution of the second distribution group;
   generate a fourth distribution by multiplying a third distribution by a weight corresponding to the third distribution;
   acquire a representative value of numerical data group constituting the fourth distribution; and
   associate a fifth distribution with the third distribution when the representative value exceeds a threshold, and refrain from associating the fifth distribution with the third distribution when the representative value is less than the threshold, the fifth distribution being one first distribution of the first distribution group, the third distribution being one second distribution of the second distribution group which is factorized from the fifth distribution.

2. The inspection result analysis device according to claim 1, wherein the processor is further configured to:
   sequentially select each first distribution of the first distribution group as the fifth distribution,
   sequentially select each second distribution of the second distribution group as the third distribution upon selecting the fifth distribution, and
   determine an association between each pair of the selected fifth distribution and the selected third distribution with reference to the threshold.

3. The inspection result analysis device according to claim 2, wherein
   the processor is further configured to output a pair of a sixth distribution and one or more first distributions associated with the sixth distribution, the sixth distribution being one second distribution of the second distribution group.

4. The inspection result analysis device according to claim 3, wherein
   the processor is further configured to count a number of the one or more first distributions associated with the sixth distribution, and output a result of the counting in association with the pair of the sixth distribution and the one or more first distributions.

5. The inspection result analysis device according to claim 1, wherein
   the representative value corresponds a maximum value, an average value, a median value, an upper limit value of a 95% confidence interval, or a third quartile of the numerical data group constituting the fourth distribution, or a value obtained by multiplying any of the maximum value, the average value, the median value, the upper limit value of the 95% confidence interval, and the third quartile by a constant.

6. The inspection result analysis device according to claim 1, wherein
   the numerical data constituting each first distribution is a value obtained in units of chips formed on the substrate.

7. The inspection result analysis device according to claim 6, wherein
   the numerical data constituting each first distribution is a number of defects obtained by the inspection of each of the chips.

8. A non-transitory, tangible computer-readable storage medium storing programmed instructions that, when executed by a computer, cause the computer to execute:

factorizing each first distribution of a first distribution group into a second distribution group and a weight group by non-negative matrix factorization of the first distribution group, each first distribution of the first distribution group being a distribution of numerical data on a surface of a substrate, the numerical data resulting from an inspection of the substrate, each weight of the weight group corresponding to a respective second distribution of the second distribution group;

generating a fourth distribution by multiplying a third distribution by a weight corresponding to the third distribution;

acquiring a representative value of numerical data group constituting the fourth distribution; and associating a fifth distribution with the third distribution when the representative value exceeds a threshold while refraining from associating the fifth distribution with the third distribution when the representative value is less than the threshold, the fifth distribution being one first distribution of the first distribution group, the third distribution being one second distribution of the second distribution group which is factorized from the fifth distribution.

9. The storage medium according to claim 8, wherein the programmed instructions cause the computer to further execute:

sequentially selecting each first distribution of the first distribution group as the fifth distribution;

sequentially selecting each second distribution of the second distribution group as the third distribution upon selecting the fifth distribution; and determining an association between each pair of the selected fifth distribution and the selected third distribution with reference to the threshold.

10. The storage medium according to claim 9, wherein the programmed instructions cause the computer to further execute:

outputting a pair of a sixth distribution and one or more first distributions associated with the sixth distribution, the sixth distribution being one second distribution of the second distribution group.

11. The storage medium according to claim 10, wherein the programmed instructions cause the computer to further execute:

counting a number of the one or more first distributions associated with the sixth distribution; and outputting a result of the counting in association with the pair of the sixth distribution and the one or more first distributions.

12. The storage medium according to claim 8, wherein the representative value corresponds a maximum value, an average value, a median value, an upper limit value of a 95% confidence interval, or a third quartile of the numerical data group constituting the fourth distribution, or a value obtained by multiplying any of the maximum value, the average value, the median value, the upper limit value of the 95% confidence interval, and the third quartile by a constant.

13. The storage medium according to claim 8, wherein the numerical data constituting each first distribution is a value obtained in units of chips formed on the substrate.

* * * * *